United States Patent [19]

Narumiya

[11] Patent Number: 4,568,273

[45] Date of Patent: Feb. 4, 1986

[54] GAS-PERMEABLE THERMAL INSULATOR

[75] Inventor: Tsuneaki Narumiya, Yokohama, Japan

[73] Assignee: Bridgestone Tire Co., Ltd., Tokyo, Japan

[21] Appl. No.: 590,555

[22] Filed: Mar. 20, 1984

Related U.S. Application Data

[62] Division of Ser. No. 386,979, Jun. 10, 1982, abandoned.

[30] Foreign Application Priority Data

| Jun. 19, 1981 | [JP] | Japan | 56-95676 |
| Aug. 12, 1981 | [JP] | Japan | 56-126317 |
| Aug. 12, 1981 | [JP] | Japan | 56-126318 |
| Feb. 10, 1982 | [JP] | Japan | 57-17619[U] |

[51] Int. Cl.$^4$ ............................................. F23G 5/12
[52] U.S. Cl. ......................................... 432/31; 432/72; 432/175; 428/304.4; 428/312.6; 428/312.8; 110/216; 110/217; 126/92 B
[58] Field of Search ............... 432/148, 147, 175, 31, 432/72; 110/216, 217; 126/92 AC, 92 B, 92 C; 428/311.1, 312.6, 312.8

[56] References Cited

U.S. PATENT DOCUMENTS

| 2,691,605 | 10/1954 | Hediger | 428/312.6 |
| 3,552,332 | 1/1971 | Mattenley | 110/216 |
| 4,073,999 | 2/1978 | Bryan et al. | 428/312.8 |
| 4,264,346 | 4/1981 | Mann | 428/312.6 |
| 4,302,502 | 11/1981 | Narumiya | 428/312.6 |
| 4,440,098 | 4/1984 | Adams | 110/216 |

Primary Examiner—John E. Kittle
Assistant Examiner—James J. Seidleck
Attorney, Agent, or Firm—Birch, Stewart, Kolasch & Birch

[57] ABSTRACT

A gas-permeable thermal insulator comprising a porous ceramic body of a three-dimensional reticulate structure having interconnected open cells is adapted to be installed in a heating oven or radiant tube so that exhaust gas passes through the insulator to exit the oven or tube while the waste heat of the gas is effectively recovered for reuse. The porous ceramic body is characterized by a bulk specific gravity of 0.25–0.6, an average pore diameter of 0.2–10 mm, a porosity of 75–95%, and an air pressure drop of 0.1–40 mm in water column when air passes through the body over a thickness of 1 cm at a velocity of 1 m/sec.

11 Claims, 11 Drawing Figures

GAS-PERMEABLE THERMAL INSULATOR

This application is a divisional of application Ser. No. 386,979 filed on June 10, 1982, now abandoned.

BACKGROUND OF THE INVENTION

The present invention relates to gas-permeable thermal insulators, and more particularly, to gas-permeable thermal insulators for use in heating ovens in which objects are heated directly or indirectly with heating gas and from which exhaust gas should be vented.

In the specification, "heating gas" means gas which is used to heat directly or indirectly an object to be heated in a heating oven and "exhaust gas" means gas which has heated the object and is to be exhausted from the heating oven. In other words, "exhaust gas" is heating gas which has finished heating the object.

Most of heating ovens are of the type in which fuel gas or oil is burned to provide hot combustion gases to heat an object to be heated therewith. In the prior art such a heating oven was thermally insulated by attaching to the wall thereof a thermal insulator in the form of a foam having a closed cellular structure such as rigid polyurethane foam, thereby achieving energy saving. However, little attention was paid to waste heat entrained with the exhaust gas except that heat exchange was conducted out of the heating oven to make effective use of the waste heat in some cases. It has not been practiced to directly reuse waste heat in heating an object to be heated within an oven as by thermally insulating an exhaust vent.

Generally, in the heat treatment of certain parts in an oven using hot gases resulting from the combustion of fuel gas or oil, the parts may be heated directly with the hot combustion gas by bringing the hot combustion gases in direct contact with the parts. In another case, the parts may be heated indirectly with the hot combustion gas by introducing the hot combustion gases into a radiant tube which is provided in an oven and emits radiations to heat the parts. In both cases, the reuse of waste heat entrained with the exhaust gas has not been fully taken into account.

SUMMARY OF THE INVENTION

An object of the present invention which has been achieved to overcome the above-mentioned problems is to provide an improved gas-permeable thermal insulator which when disposed in an exhaust vent or duct of a heating oven for discharging exhaust gas, can thermally insulate the exhaust vent or duct, efficiently recover waste heat of the exhaust gas by allowing the exhaust gas which has heated objects to be heated to pass through the thermal insulator and transduce the thus recovered waste heat into radiation which may be fed back to the heating zone toward the objects in the oven so that the radiation is directly used to heat the objects, thereby achieving a substantial energy saving.

The present invention provides a gas-peameable thermal insulator comprising a porous ceramic body of a three-dimensional reticulate structure having interconnected open cells. According to the present invention, the porous ceramic body has a bulk specific gravity of 0.25–0.6, an average pore diameter of 0.2–10 mm, a porosity of 75–95%, and an air pressure drop of 0.1–40 mm in water column when air passes through the porous ceramic body over a thickness of 1 cm at a velocity of 1 m/sec.

The inventor has found that when a porous ceramic body as defined above is disposed as a thermal insulator in an exhaust vent or duct of an oven in which an object to be heated is heated directly with heating gas, not only the radiant heat from the heating zone is reflected toward the object by impinging upon the thermal insulator, but also the exhaust gas which has been used to heat the object exchanges heat with the thermal insulator when the gas passes through the interconnected open cells of the thermal insulator. The thus heated insulator emits heat by radiation into the heating zone which may also be used to heat the object to be heated. The waste heat is effectively recovered and directly reused to achieve a substantial energy saving. In addition, the exhaust gas can pass the thermal insulator through its interconnected open cells without any obstruction, and the application of the thermal insulator to a combustion heating oven does not disturb the combustion process. The application of the thermal insulator to a radiant tube results in similar effects as a porous ceramic body of the above structure, having both the characteristics of gas permeability and thermal insulation. The present invention is made on the basis of these findings.

Since the gas-permeable thermal insulator according to the present invention comprises a porous ceramic body of a three-dimensional reticulate structure having interconnected open cells and having a bulk specific gravity of 0.25–0.6, an average pore diameter of 0.2–10 mm, a porosity of 75–95%, and an air pressure drop of 0.1–40 mm in water column when air passes through the porous ceramic body over a thickness of 1 cm at a velocity of 1 m/sec. as described earlier, it is not only effective in reflecting radiant heat from the heating zone back to the heating zone, but also ensures the heat exchange between the thermal insulator and the exhaust gas passing therethrough, such that the heated insulator emits a substantial quantity of radiation at its surface toward the heating zone, succeeding in reusing the waste heat to heat an object to be heated in the heating oven by efficiently recovering the waste heat which is otherwise lost with the exhaust gas, achieving substantial energy saving. Because of a minimum pressure drop across the thermal insulator according to the present invention, the application of the insulator to a combustion heating oven does not disturb combustion. The thermal insulator according to the present invention has a sufficient strength to advantageously apply it to a heating oven from which heating gas should be vented.

According to a preferred embodiment of this invention, an emissive power modifier may be dispersed in the porous ceramic body or applied to at least a part of the cell-defining strands of the porous ceramic body. More specifically, the emissive power modifier may be applied to all the cell-defining strands or those cell-defining strands of the porous ceramic body which are at the inlet when the insulator is placed in the gas path. The emissive power modifier may be a transition metal oxide. Since the thus treated gas-permeable thermal insulator having a considerably increased emissive power can highly efficiently emit radiation from its surface, particularly, from the surface facing the heating zone, it contributes to substantial energy saving.

In a further preferred embodiment of the present invention, the porous ceramic body of a three-dimensional reticulates structure having interconnected open cells is provided at its outer surface with at least one slit. The provision of a slit or slits is effective in releasing thermal stresses due to temperature differences which otherwise cause the occurrence of random cracks and resultant failure of the ceramic body, by leading such thermal stresses to the slit to eliminate them.

BRIEF DESCRIPTION OF THE DRAWINGS

The above and other objects, features and advantages of this invention will be more fully understood from the following description taken in conjunction with the accompanying drawings, in which.

DETAILED DESCRIPTION OF THE INVENTION

The gas-permeable thermal insulator according to the present invention comprises a porous ceramic body of a three-dimensional reticulate structure having interconnected open cells which form a continuous passage for exhaust gas. Conventional thermal insulators of the foam type generally have closed cells for the purpose of enhancing thermal insulation. Such conventional closed-cell thermal insulators which are usually made of rigid polyurethane foam cannot be placed in an exhaust vent or duct of an oven as they do not permit fluid flow thereacross. The porous body used in the present invention is gas permeable because of its interconnected open cell structure. Preferred are porous ceramic bodies substantially free of closed cells. Such a porous ceramic body may preferably be prepared by applying a ceramic slurry to a reticulated flexible polyurethane foam and sintering the treated foam to remove the polyurethane foam through carbonization. By starting from a reticulated or cell membrane-free flexible polyurethane foam, there is obtained a porous ceramic body of a cage configuration consisting of the edges of a regular dodecahedron. The cage-like porous ceramic body has a sufficiently increased porosity to allow exhaust gas to pass therethrough without a substantial pressure drop, and comprises interconnected open cells defined by a complicated network of strands upon which exhaust gas impinges during its passage through the interconnected open cells, providing efficient heat exchange.

The porous ceramic body of the present invention may be prepared by any well-known methods, for example, by dipping a reticulated or cell membrane-free flexible polyurethane foam in a ceramic-forming slurry, taking up the foam, blowing air to the foam to remove an excess of the ceramic slurry and dry the ceramic slurry-applied foam, repeating the dipping and air blowing steps several time, and finally sintering the ceramic slurry-applied foam. The ceramic material used in the form of a slurry in such a method may be any known material, and accordingly, the material of which the porous ceramic body is made is not particularly limited. Thermal impact ceramic materials containing at least 20% by weight of cordierite are preferred particularly when the ceramic body is used where temperature widely varies. Heat resistant ceramic materials, specifically those containing at least 87% by weight of alumina are preferred particularly when the ceramic body is possibly used at temperatures above 1250° C.

Figure 1:
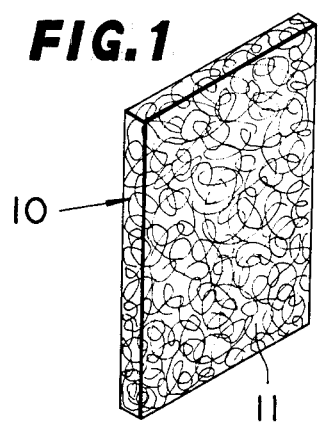
FIGS. 1 to 4 are perspective views of different embodiments of the gas-permeable thermal insulator according to this invention.
Figure 2:
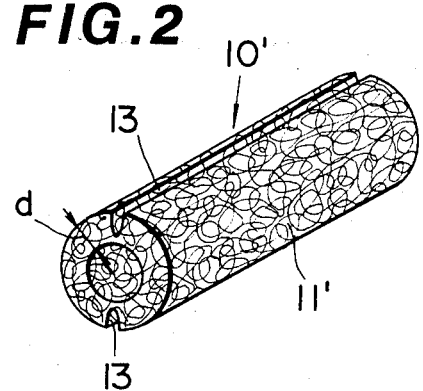
Figure 3:
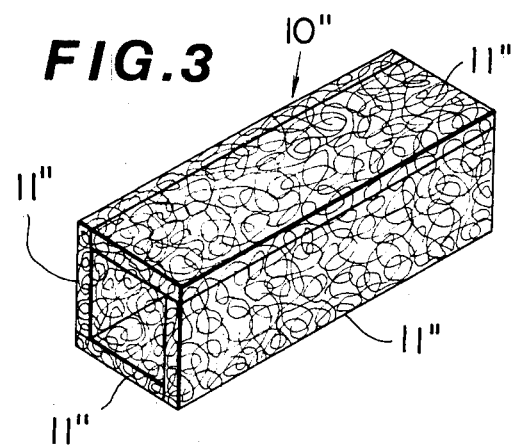
Figure 4:
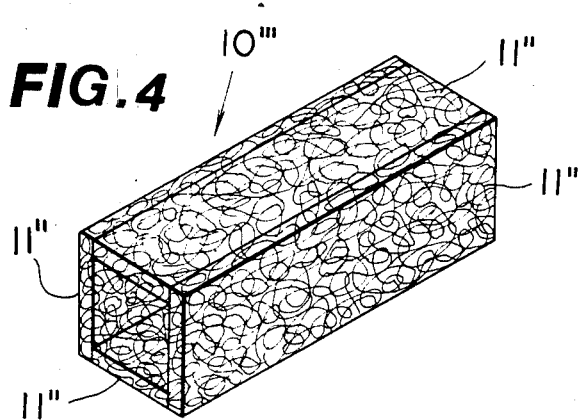

The gas-permeable thermal insulator according to this invention may take any desired shape depending on the type and position of a heating oven to which the insulator is mounted and the method of mounting. Referring to FIG. 1, the gas-permeable thermal insulator 10 of this invention is shown as comprising a porous ceramic body 11 in the form of a rectangular plate. The gas-permeable thermal insulator 10' may also take the form of a hollow cylindrical body 11' as shown in FIG. 2. As shown in FIG. 3 or 4, the cylindrical or tubular thermal insulator 10" or 10''' may be formed by combining a plurarity of flat porous ceramic bodies 11" to a cylindrical or tubular form. The thermal insulator comprising a solid porous body of a rectangular or cubic shape as shown in FIG. 1 may preferably be used in heating ovens of the type wherein heating gas is directly fed to an object to be heated, while the cylindrical or tubular thermal insulator as shown in FIGS. 2 to 4 may preferably be used in radiant tubes.

Figure 5:
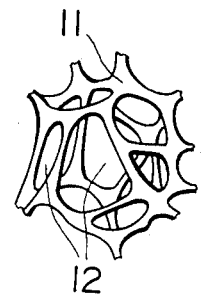
FIG. 5 is an enlarged perspective view of part of a porous ceramic body constituting the gas-permeable thermal insulator according to this invention.

FIG. 5 shows an enlarged perspective view of part of a porous ceramic body constituting the gas-permeable thermal insulator. As shown in FIG. 5, the porous ceramic body 11 has a three-dimensional reticulate structure having a number of interconnected open cells 12 which are defined by interconnected strands and constitute a continuous passage for exhaust gas.

If necessary, the gas-permeable thermal insulator according to the present invention may be provided with a slit. In FIG. 2, a gas permeable thermal insulator comprises the porous ceramic body 11' of a three-dimensional reticulate structure having interconnected open cells which is proivded with slits 13, 13 in the outer surface thereof. In this embodiment, the porous ceramic body 11' is of a hollow cylinder and the slits 13,13 extend axially along the outer surface of the body 11' from one end to the other end without discontinuity. The slits 13,13 are made in the form of a narrow channel which not only extends axially, but also extend radially to a depth equal to ½ to 9/10 of a radial thickness d of the wall of the hollow cylinder. Although the slits are formed to the porous ceramic body of a cylindrical shape in the above-mentioned embodiment, they may be formed to the ceramic bodies of any desired shape. For example, slits may be formed to the outer surface of the ceramic bodies having a rectangular or cubic shape. The number of slits is not limited to two as in the above-mentioned example, and one or three or more slits may be formed.

The provision of at least one slit in the outer surface of the porous ceramic body allows thermal stresses to concentrate at the slit to thereby release the thermal stresses when the porous ceramic body is used in applications where the body tend to undergo thermal stress. The thermal stress, unless released, would cause cracks to develop in the porous ceramic body, leading to failure of the body. The provision of a slit can advantageously prevent the formation of such cracks. More illustratively, although a porous ceramic body having a three-dimensional reticulate cellular structure is a preferred gas-permeable thermal insulator to be used in a heating oven from which exhaust gas should be vented, a possible increased heating or cooling rate and local heating or cooling would cause thermal stress to develop which would cause the porous ceramic body to be randomly broken. Particularly when the gas-permeable thermal insulator of a cylindrical shape to be mounted in a radiant tube is composed of a porous ceramic body, a substantial temperature difference would occur between the outer and inner surfaces of the cylindrical body acting as the inlet and outlet for the exhaust gas, respectively. As a result of this temperature difference, complicated cracks develop on the outer surface of the gas-permeable thermal insulator or porous ceramic body in a direction transverse to the circumferential direction, sometimes leading to failure of the gas-permeable thermal insulator or porous ceramic body. Since thermal stresses may be effectively released by providing a slit as described above, the gas-permeable thermal insulator of this invention is free of the possibility that thermal stresses induce fine cracks to break the insulator even when the insulator is mounted in a heating oven or radiant tube from which heating gas should be continuously vented.

The porous ceramic body constituting the gas-permeable thermal insulator of this invention is required to have a bulk specific gravity of 0.25-0.6, preferably 0.25-0.5, an average pore diameter of 0.2-10 mm, preferably 0.2-5 mm, more preferably 0.3-1.5 mm, a porosity of 75-95%, preferably 80-95%, and an air pressure drop of 0.1-40 mm, preferably 5-30 mm in water column when air passes through the porous ceramic body over a thickness of 1 cm at a velocity of 1 m/sec. These requirements must be met to provide a useful gas-permeable thermal insulator having both the characteristics of gas permeability and thermal insulation. Improved gas-permeable thermal insulators can be obtained only when all the requirements are satisfied. More specifically, strength is insufficient when the bulk specific gravity is lower than 0.25. The cells of a porous ceramic body tend to be blocked to increase the pressure drop across the body with a bulk specific gravity of higher than 0.6. The strength is reduced and the pressure drop is increased with a pore diameter of less than 0.2 mm. An average pore diameter of more than 10 mm is also undesirable because the contact between the insulator and the exhaust gas flowing therethrough is minimized and heat would undesirably transfer from the front surface or receiving side to the rear surface or discharging side of the insulator. With a porosity of less than 75%, interior heat transfer is increased to reduce the temperature difference between the front and rear surfaces of the insulator to cause radiations to be dissipated from the insulator at the rear surface or discharging side. A porosity of more than 95% is also undesired because of a reduced strength. A pressure drop of more than 40 mm tends to disturb combustion in a heating oven. In either case, the object of this invention cannot be properly attained.

The gas-permeable thermal insulator according to this invention may be further improved in emissive power by dispersing an emissive power modifier in a porous ceramic body or applying an emissive power modifier to all the cell-defining strands or those cell-defining strands of a porous ceramic body which are at the inlet when the insulator is placed in the path of exhaust gas. The emissive power modifier may be silicon carbide or silicon nitride although transition metal oxides, particularly oxides of vanadium, chromium, manganese, iron, cobalt, and nickel are preferred because of their outstanding effect. The emissive power modifier may be dispersed in a porous ceramic body by dispersing the emissive power modifier into a ceramic slurry from which the porous ceramic body is formed. The cell-defining strands of the porous ceramic body may be coated with the emissive power modifier by dispersing the emissive power modifier in water or any other suitable solvent, immersing a preformed porous ceramic body partially or entirely into the dispersion, and drying or sintering the treated body.

An improved radiation effect is obtained when the gas-permeable thermal insulator contains the emissive power modifier in an amount of 0-90%, more preferably 1-50% by weight based on the total weight of the insulator.

In addition to or instead of the above-mentioned transition metal oxides, one or more of metal nitrides and metal carbides may be dispersed in or applied to the cell-defining strands of a porous ceramic body to increase the emissive power or enhance the thermal impact and thermal resistance of the porous ceramic body, thereby improving the adaptability of the porous ceramic body to gas permeable thermal insulation. Examples of the nitrides are TiN, ZrN, $Si_3N_4$, etc., and examples of the carbides are TiC, ZrC, HfC, VC, TaC, NbC, WC, BiC, SiC, etc. Furthermore, metal borides, for example, AlB, SiB, $TiB_2$, $ZrB_2$, $HfB$, $VB_2$, TaB, WB, etc. may also be dispersed in or applied to the cell-defining strands of the porous ceramic body.

The gas-permeable thermal insulator according to this invention may be placed in an exhaust vent or duct of a heating oven in which an object to be heated is heated directly with a hot gas resulting from the combustion of a fuel gas or oil. For example, the gas-permeable thermal insulator may preferably be placed so as to cover or enclose the object to be heated. Then, the object is heated not only with the heating gas, that is, radiant heat in the heating zone, but also with the radiant heat reflected toward the heating zone by the insulator and radiation emitted by the insulator which is heated through the heat exchange with the exhaust gas (which has passed the object to be heated) flowing through the insulator. Consequently, the waste heat which is wasted or not used to heat the object in the prior art system contributes to the heating of the object, resulting in an increased heating efficiency. When the above-mentioned emissive power modifier is used to improve the emissive power of the gas-permeable thermal insulator, the object to be heated is heated more effectively with more radiation from the modified gas-permeable thermal insulator, resulting in a further increased heating efficiency.

The gas-permeable thermal insulator of the present invention may also be placed in a radiant tube in a heating oven of the type wherein heating gas is introduced into the radiant tube which emits radiation to heat an object to be heated.

The arrangement of the heating oven in which the gas-permeable thermal insulator of this invention is mounted is not particularly limited. The gas-permeable thermal insulator may be located in an exhaust vent or duct of a heating oven of the type in which an inlet and an outlet are provided and an object is directly heated with heating gas flowing through the oven from the inlet to the outlet. More specifically, in a heating oven which has an inlet and an outlet for the heating gas to flow thereacross and includes a gas-permeable thermal insulator secured in the oven near the outlet, wherein the object to be heated is placed in a heating zone of the oven between the inlet and the insulator, the heating gas flows through the oven from the inlet to the outlet through the insulator, and the waste heat of the gas is transferred to the insulator so that the heated insulator emits heat by radiation to the object, whereby the object is heated with both the flowing heating gas and with the radiation gas from the insulator. It is preferred that a heating gas swirl chamber is defined between the inlet and the heating zone where the object to be heated is placed. The inlet is connected to the swirl chamber in register with one side wall of the swirl chamber so that the heating gas is introduced from the inlet into the swirl chamber at a tangent and whirls in the chamber while dust entrained in the gas precipitates therefrom. The heating gas directed to the object is thus freed of dust.

Figure 6:
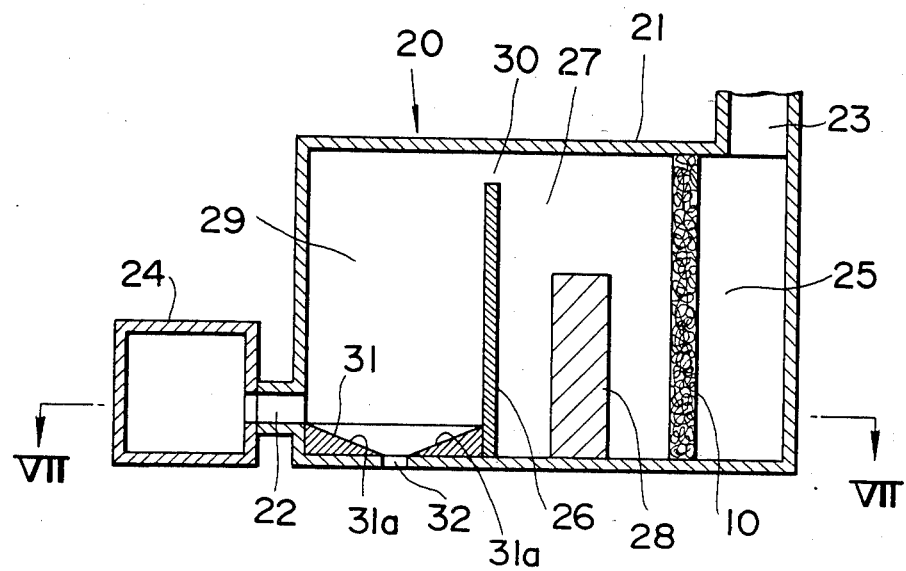
FIGS. 6 and 7 illustrate an example of a heating oven having the gas-permeable thermal insulator of FIG. 1 located therein, FIG. 6 being an elevational cross section taken along line VI—VI in FIG. 7, and FIG. 7 being a horizontal cross section taken along line VII—VII in FIG. 6.
Figure 7:
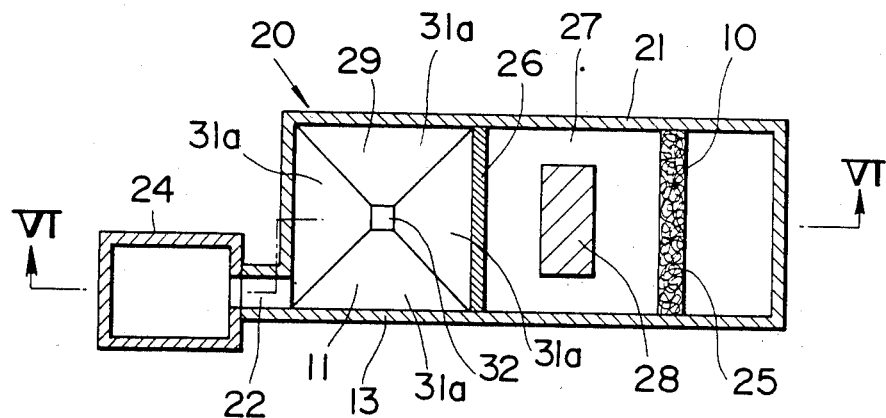

A preferred embodiment of this type of a heating oven is shown in FIGS. 6 and 7. A lateral heating oven 20 is shown as comprising a rectangular housing 21 having an inlet 22 for heating gas and an outlet 23 for exhaust gas. The oven housing 21 is in fluid communication with a heating gas source in the form of a combustion furnace 24 through the inlet 22. In the combustion furnace 24, a fuel, for example, oil is burned to produce a heating gas which is introduced into the oven housing 21 through the inlet 22.

A gas-permeable thermal insulator 10 in the form of a flat plate as shown in FIG. 1 is secured in the oven housing 21 near the outlet 23 so as to define a discharge region 25. The interconnected open cells of the gas-permeable thermal insulator 10 provide a gas flow path. In the oven housing 21, a partition 26 is secured between the insulator 10 and the inlet 22 to define a heating zone 27 between the partition 26 and the insulator 10. An object to be heated 28 is placed in the heating zone 27. The partition 26 also defines a heating gas swirl chamber 29 between the partition 26 and the housing side wall at the inlet side. The partition 26 extends from the bottom of the housing 21 to just below the top wall of the housing 21 to leave a free space 30 between the top of the partition 26 and the top wall of the housing 21. The bottom 31 of the heating gas swirl chamber 29 consists of four ramp segments 31a which are slanted from the respective sides to the center to define a central port 32 for discharging collected dust. The heating gas swirl chamber 29 may also have a flat bottom.

The heating gas inlet 22 is connected to the heating oven 21 at the bottom and in line with one side wall 33 of the swirl chamber 29 such that the heating gas is introduced into the swirl chamber 29 along its side wall 33.

With the above-mentioned arrangement, the heating oven shown in FIGS. 6 and 7 is operated as follows. The heating gas from the combustion furnace 24 is first introduced into the swirl chamber 29 of the oven housing 21 along its side wall 33 so that the heating gas whirls upwards in the swirl chamber 29 while the entrained dust precipitates on the bottom 31. Then the heating gas enters the heating zone 27 where the object to be heated 28 is placed through the free space 30 between the partition top and the housing wall. The object 28 is heated with the heating gas in this manner. The heating gas which has heated the object 28, i.e. the exhaust gas, flows through the gas-permeable thermal insulator 10 or interconnected open cells of a porous ceramic body and then exits from the outlet 23. During the passage of the exhaust gas through the gas-permeable thermal insulator 10, the waste heat of the gas is transferred to the insulator 10 which will emit heat by radiation. That is, the waste heat is transduced into radiation. Accordingly, the object 28 is additionally heated with the radiation from the gas-permeable thermal insulator 10. Furthermore, the insulator 10 reflects the radiant heat from the heating zone 27 to return the heat back to heating zone 27, and hence, the object 28 is also heated with the reflected radiant heat. Consequently, the object 28 is heated at a substantially increased heat efficiency. Since the heating oven 20 shown in FIGS. 6 and 7 is designed such that the heating gas first introduced in the oven housing 21 whirls upward in the swirl chamber 29 while the dust entrained in the heating gas is effectively removed. The gas contains little dust when it passes through the gas-permeable thermal insulator 10 which is prevented from being blocked with dust. The gas-permeable thermal insulator 10 exerts its full function without experiencing such an incovenience as an increased pressure drop, ensuring the normal operation of the heating oven. If dust-laden heating gas is directly introduced into the heating zone of the oven from a source, the gas-permeable thermal insulator is readily clogged with dust to block the flow of the gas or disturb the normal operation of the oven. The swirl chamber located intermediate the combustion furnace and the heating zone is effective in removing dust entrained in the heating gas so that dust-free gas flows through the insulator, and hence, prevents the gas-permeable thermal insulator from being blocked with dust, thereby allowing the gas-permeable thermal insulator to exert its own effect.

Figure 8:
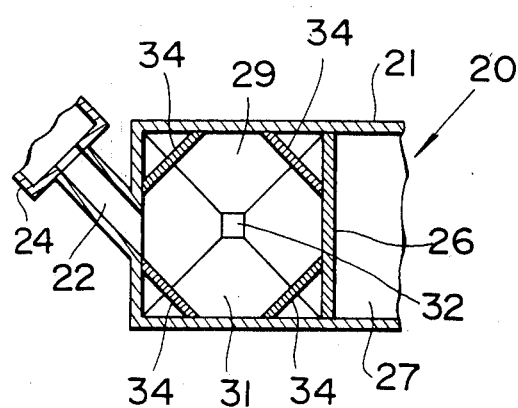
FIGS. 8 and 9 are partially cut-away cross sectional views similar to FIG. 7, illustrating different examples of the swirl chamber of the heating oven, respectively.
Figure 9:
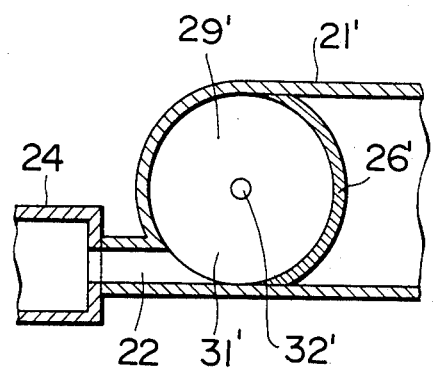

Although the example shown in FIGS. 6 and 7 uses the swirl chamber 29 of a rectangular column shape, the shape of the swirl chamber 29 is not limited thereto. For example, the swirl chamber 29 of a rectangular shape may be further provided with guide walls 34 at the respective corners as shown in FIG. 8. Alternatively, the swirl chamber 29' may be formed substantially in a cylindrical shape by modifying both the side wall of the oven housing 21' enclosing the swirl chamber and the partition 26' into a semi-circular shape in cross section as shown in FIG. 9. The cylindrical swirl chamber 29' allows heating gas to whirl more smoothly. In FIG. 6, numeral 31' shows the bottom of the chamber 29' and numeral 32' shows the central port for discharging collected dust.

The heating oven of a lateral type is described in the foregoing embodiments, although the heating oven may also be of a vertical type. Furthermore, modifications may, of course, be made on the remaining components of the heating oven.

Figure 10:
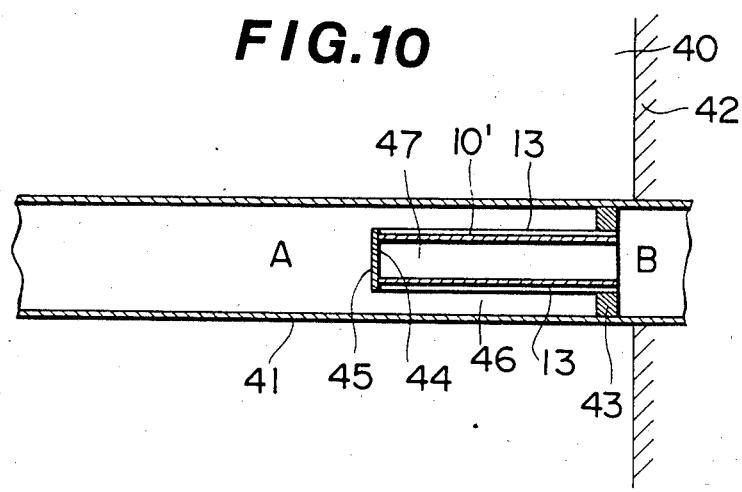
FIG. 10 is a schematic cross section showing another heating oven having a radiant tube in which the gas-permeable thermal insulator of FIG. 2 is mounted.

FIG. 10 shows another heating oven 40 combined with a radiant tube 41 in which the gas-permeable thermal insulator according to the present invention is mounted. More specifically, a radiant tube 41, the outlet portion of which is shown, extends through an interior of a heating oven 40 and penetrates into a wall 42 of the oven 40. It is to be noted that the upstream and downstream sides are designated as A and B, respectively, with respect to the flow of heating gas through the radiant tube 41. The downstream side B is an outlet for the gas in the illustrated example. A gas-permeable thermal insulator 10' in the form of a hollow cylindrical porous ceramic body 11' as shown in FIG. 2 is coaxially placed in the radiant tube 41 by means of a ring-shaped partition 43 secured between the downstream end of the insulator 10' and the inner wall of the radiant tube 41 near its outlet B. The free open end 44 of the insulator 10' facing the upstream side A is closed with a cover 45. The partition 43 and the cover 45 are both gas impermeable. The heating oven 40 is operated as follows. A heating gas, for example, hot combustion gases produced by burning oil or any other suitable fuel is introduced into the radiant tube 41 which is heated therewith and emits heat by radiation towards objects (not shown) in the heating oven 40 to heat them. Flowing through the radiant tube 41, the heating gas reaches the outlet portion where the gas-permeable thermal insulator 10' is mounted. The gas enters an annular space 46 between the outer surface of the insulator 10' and the inner wall of the radiant tube 41, penetrates into an interior 47 of the insulator 10' from its outer surface through its interconnected open cells, and then flows in downstream direction toward the outlet side B. As the gas flows into the interior 47 of the gas-permeable thermal insulator 10' from its outer surface through its interconnected open cells, the waste heat of the gas is transferred to the insulator 10' which emits heats by radiation to heat the radiant tube 41. Thus, the waste heat of the gas which is otherwise discharged in vain is effectively recovered and used.

It is advantageous to provide the gas-permeable thermal insulator 10' with slits 13,13 when the insulator is mounted in the radiant tube 41. Even when thermal stresses develop in the gas-permeable thermal insulator 10' due to the temperature difference between the outer and inner surfaces thereof as a result of rapid heating or cooling or local heating or cooling, the thermal stresses concentrate at the axial slits 13,13 in the insulator 10' so that the occurrence of random cracks over the insulator 10' and the failure of the insulator 10' are prevented. Particularly when the gas-permeable thermal insulator 10' is provided with the continuous axial slits 13,13 extending from one end to the other end, stress elimination is satisfactory.

In the case of a gas-permeable thermal insulator having slits formed therein, the slits may be filled with a suitable heat resistant filler, for example, glass fibers and ceramic fibers, for the purpose of preventing leakage of gas through the slits. As the slits are provided by machining or molding a channel and not by cutting the cylindrical ceramic body, the filler is readily received in the slits.

An example of the present invention is shown below together with a control.

EXAMPLE

Figure 11:
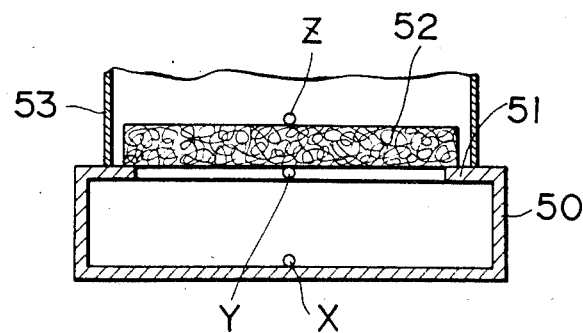
FIG. 11 is a schematic cross section of a device used in a thermal insulation test of the gas-permeable thermal insulator of this invention.

A test was carried out using a device shown in FIG. 11. A box 50 having a floor area of 50 cm×50 cm and a height of 5 cm was prepared. A combustion chamber was defined by securing a slitted partition at one corner of the box, and a burner for burning butane gas was mounted therein. The box 50 has an exhaust opening 52 of 40 cm×40 cm at the center of its top wall 51. A gas-permeable thermal insulator 53 in the form of a rectangular ceramic plate of 42 cm×42 cm×2 cm (thick) having properties shown in Table 1 was placed on the top wall 51 to completely cover the opening 52. Three thermocouples symbolically shown at X, Y and Z were located at the central positions on the box bottom and the insulator lower and upper surfaces. The exhaust opening 52 and the insulator 53 were enclosed by an exhaust duct 54. The ceramic plates were prepared by applying ceramic slurry to reticulated flexible polyurethanes foam and sintering the treated foam.

The burner was fired to burn butane gas for 4 hours until the temperature sensed by the thermocouple X reached 1,000° C. After this warming-up, the amount of butane gas consumed to keep the temperature for a further one hour was determined. The temperatures of thermocouples Y and Z were also recorded.

As a control, a similar operation was carried out without the insulator, and the amount of gas consumed and the temperatures of thermocouples Y and Z were recorded under similar conditions.

The results are shown in Table 2. The sample number 9 is the control. The amounts of gas consumed are expressed as index numbers on the basis of the control = 100. Each value is an average of several runs.

TABLE 1

Properties of Porous Ceramic Plate

| | Sample No. | | | | | | | | |
|---|---|---|---|---|---|---|---|---|---|
| | 1 | 2 | 3 | 4 | 5 | 6 | 7 | 8 | 9 |
| Average pore diameter (mm) | 0.5 | 1 | 1 | 1.25 | 1.25 | 1.9 | 4.1 | 4.1 | — |
| Bulk specific gravity | 0.30 | 0.38 | 0.40 | 0.38 | 0.43 | 0.38 | 0.45 | 0.52 | — |
| Porosity (%) | 89.3 | 85.0 | 84.6 | 86.4 | 83.5 | 86.6 | 84.0 | 81.4 | — |
| Air pressure drop (mm*[1]) | 30.0 | 14.4 | 26.0 | 8.8 | 13.2 | 2.7 | 1.3 | 1.5 | — |
| Main component (% by weight) | | | | | | | | | |
| Cordierite | 30 | 50 | 50 | 35 | 50 | 30 | 35 | 30 | — |
| Alumina | 30 | 25 | 20 | 35 | 20 | 30 | 35 | 30 | — |
| Silicon carbide | 0 | 0 | 20*[2] | 0 | 13*[2] | 0 | 5*[3] | 0 | — |
| Nickel oxide | 0 | 0 | 0 | 0 | 0 | 5*[3] | 0 | 10 | — |

*[1]The pressure drop across a gas-permeable thermal insulator in the form of a 20-mm thick porous ceramic plate when air passed at a velocity of 1 m/sec. at room temperature, expressed in terms of millimeter of water column.

*[2]Porous ceramic plate having emissive power modifier dispersed therein.

*[3]Porous ceramic plate having emissive power modifier applied to strand surface.

TABLE 2

| | Test Result Sample No. | | | | | | | | |
|---|---|---|---|---|---|---|---|---|---|
| | 1 | 2 | 3 | 4 | 5 | 6 | 7 | 8 | 9 |
| Amount of gas consumed | 62.0 | 81.4 | 66.0 | 88.3 | 82.9 | 90.1 | 92.3 | 90.3 | 100 |
| Temperature of thermocouple Y (°C.) | 1020 | 1000 | 995 | 980 | 990 | 985 | 980 | 970 | 980 |
| Temperature of thermocouple Z (°C.) | 615 | 740 | 740 | 760 | 750 | 780 | 810 | 800 | 980 |

The data of Table 2 shows that the gas-permeable thermal insulator of the present invention exerts improved thermal insulation and contributes to substantial energy saving.

It is further understood by those skilled in the art that the foregoing description is a preferred embodiment and that various changes and modifications may be made in the invention without departing from the spirit and scope thereof.

What is claimed is:

1. In a method for recovering waste heat from an exhaust gas and returning it to a heating oven provided with a heated gas and an exhaust zone, which comprises disposing a gas-permeable thermal insulator in said exhaust zone for recovering said exhaust heat from the exhaust gas and radiating it back to the heating oven, said gas-permeable thermal insulator comprising a porous ceramic body of a three-dimensional reticulate structure having interconnected open cells, said porous ceramic body having a bulk specific gravity of 0.25–0.6, an average pore diameter of 0.2–10 mm, a porosity of 75–95%, and an air pressure drop of 0.1–40 mm in water column when air passes through the porous ceramic body over a thickness of 1 cm at a velocity of 1 m/sec.

2. The method of claim 1 wherein the heated gas is introduced into a chamber for removing dust particles prior to being introduced into the heated oven.

3. The method of claim 1 wherein the porous ceramic body contains an emissive power modifier dispersed therein to improve the return of waste heat back to the heating oven, said emissive power modifier being selected from the group consisting of metal carbides, metal nitrides, metal borides and transition metal oxides.

4. The method according to claim 1, wherein said porous ceramic body has a bulk specific gravity of 0.25–0.5, an average pore diameter of 0.2–5 mm, a porosity of 80–95%, and an air pressure drop of 5–30 mm in water column when air passes through the porous ceramic body over a thickness of 1 cm at a velocity of 1 m/sec.

5. The method according to claim 1, wherein said porous ceramic body is prepared by applying a ceramic slurry to a reticulated flexible polyurethane foam and sintering the treated foam to remove the polyurethane foam through carbonization.

6. The method according to claim 1, wherein said porous ceramic body comprises at least 20% by weight of cordierite.

7. The method according to claim 1, wherein said porous ceramic body comprises at least 87% by weight of alumina.

8. The method according to claim 1, wherein said porous ceramic body is provided at the outer surface with at least one slit.

9. The method according to claim 4, wherein said porous ceramic body is hollow, and said slit is made in the form of a channel in the outer surface of the hollow porous ceramic body.

10. The method according to claim 9, wherein said porous ceramic body is hollow and cylindrical, and said slit is made in the form of an axial channel extending throughout the length along the outer surface of the cylindrical porous ceramic body.

11. In a method for recovering waste heat from an exhaust gas of a heating oven in which an object is heated with a heating gas in a heating zone and from which the exhuast gas is vented, which comprises disposing a gas-permeable thermal insulator composed of a porous ceramic body of a three-dimensional reticulate structure having interconnected open cells in an exhaust vent or duct of the heating oven for discharging the exhaust gas so that the insulator closes the exhaust vent or duct and the interconnected open cells of the insulator provides an exhaust gas flow path, said porous ceramic body having a bulk specific gravity of 0.25–0.6, an average pore diameter of 0.2–10 mm, a porosity of 75–95%, and an air pressure drop of 0.1–40 mm in water column when air passes through the porous ceramic body over a thickness of 1 cm at a velocity of 1 m/sec, whereby radiant heat from the heating zone is reflected towards the heating zone by impinging upon the insulator and the waste heat of the exhaust gas is recovered and transduced into radiation to emit it back to the heating zone when the exhaust gas passes through the interconnected open cells of the insulator.

* * * * *